United States Patent [19]

Hattan

[11] Patent Number: 4,802,805
[45] Date of Patent: Feb. 7, 1989

[54] FATIGUE RESISTANT FASTENERS AND RELATED METHODS

[75] Inventor: Mark Hattan, Orange, Calif.

[73] Assignee: William P. Green, Pasadena, Calif.; a part interest

[21] Appl. No.: 41,638

[22] Filed: Apr. 23, 1987

Related U.S. Application Data

[60] Continuation of Ser. No. 742,290, Jun. 7, 1985, abandoned, which is a division of Ser. No. 380,439, May 20, 1982, Pat. No. 4,545,104, which is a continuation-in-part of Ser. No. 111,774, Jan. 14, 1980.

[51] Int. Cl.$^4$ .................. F16B 39/28; F16B 39/30
[52] U.S. Cl. ........................... 411/263; 411/307; 411/432; 411/937.1
[58] Field of Search ............... 411/263, 288, 290, 291, 411/307, 312, 432, 937, 937.1

[56] References Cited

U.S. PATENT DOCUMENTS

| 770,945 | 9/1904 | Tuller | 411/223 |
|---|---|---|---|
| 1,123,505 | 1/1915 | Eilers | 411/290 |
| 2,328,706 | 9/1943 | Brackett | 411/223 |
| 3,385,339 | 5/1968 | Dahl | 411/288 |
| 3,943,587 | 3/1976 | Lasky | 411/438 X |
| 4,364,136 | 12/1982 | Hattan | 411/223 X |

FOREIGN PATENT DOCUMENTS 158878 11/1921 United Kingdom ............ 411/223

Primary Examiner—Neill R. Wilson
Attorney, Agent, or Firm—William P. Green

[57] ABSTRACT

A fatigue resistant threaded connection includes a nut having two threads which are aligned axially but turned relative to one another about their common axis through an angle great enough to cause development of large axial forces between the screw and nut threads when they are connected together, resulting in improved distribution of load forces between the two threads of the nut and improved resistance of the screw and nut to fatigue and tensile failures.

5 Claims, 3 Drawing Sheets

FATIGUE RESISTANT FASTENERS AND RELATED METHODS

This is a continuation of copending application Ser. No. 6/742,290 filed June 7, 1985, now abandoned, which was a division of copending application Ser. No. 6/380,439 filed May 20, 1982, now U.S. Pat. No. 4,545,104, which was a continuation-in-part of copending application Ser. No. 6/111,774 filed Jan. 4, 1980.

BACKGROUND OF THE INVENTION

The present invention relates to improved threaded fasteners and threaded connections of a type having a greater capacity than conventional similar threaded connections to resist fatigue and tensile failures under the stresses encountered in use, and desirably also having a self-locking action. Certain features of the invention relate to improved methods for manufacturing such fasteners or for using them in forming a fatigue resistant threaded connection. The invention will be described primarily as applied to threaded nuts.

In a conventional threaded connection between an externally threaded screw and a nut disposed thereabout, failure of the threads of either the screw or nut under excessive tensile load conditions or as a result of fatigue normally occurs at the location of the inner or 'bottom' turns of the nut thread, that is, the turns which are closest to the load bearing face of the nut. This is true because those bottom turns inherently must take a greater proportion of the total axial load exerted on the nut than do the other turns. Each successive turn of the nut thread above the 'bottom' one takes less of the axial load than the next lower turn, with the result that most of the load is taken by the lower portion of the nut, and a relatively small part of the load is taken by the upper portion of the nut. This uneven distribution of the load forces among the different turns of the threads results in the discussed tendency for early fatigue and failure of the screw and nut at the location of the bottom turns of the nut thread.

SUMMARY OF THE INVENTION

The present invention provides a unique threaded connection which achieves a vastly improved distribution of load forces as compared with conventional fasteners in a manner enabling the overall assembly to withstand higher load forces without failure from either tensile or fatigue effects. Instead of the load forces being taken predominantly by the threads at the lower portion of the nut, the structure of fasteners embodying the invention is such as to shift a large part of the forces which would normally be localized in the bottom of the nut to an upper portion of the nut, with resultant distribution of those forces over essentially the entire axial extent of the nut. At the same time, a locking action produced by the fastener is more effective than that found in most prior self-locking nuts, and is of a character to retain the self-locking action through many cycles of connection and detachment of the threaded parts. Further, a fastener embodying the invention, besides distributing the primary load forces more uniformly than in prior fasteners, also distributes the self-locking forces more uniformly be between the different turns of the threads.

A connection embodying the invention includes a fastener having a body structure provided with two similar threads secured in fixed axially aligned relative positions enabling the fastener and both of its threads to be screwed into engagement with a single coacting threaded member. Preferably, the two threads are formed on two different fastener bodies suitably attached together by fusion bonding, i.e. welding, brazing or soldering. Electron beam welding is preferred in most instances where maximum strength is required.

The two threads are turned slightly relative to one another about their common axis to positions in which neither is a true helical continuation of the other, so that they engage a coacting threaded member slightly differently and have a high torque interfering fit therewith which results in distribution of axial load forces more uniformly than in conventional nuts among the different turns of the engaged threads. In addition, each of the two sections of the composite fastener may be completely uniform in diameter, pitch, etc. through its entire axial extent, and by virtue of that uniformity can be effectively and accurately measured by gauges before the two sections are secured together, in order to assure the precision of manufacture required for aircraft uses and the like. In most conventional lock nuts, such gauging is not possible or practical because of the presence in the lock nut structure of a deformed turn or special friction element for attaining the self-locking action.

In order to achieve the discussed load distributing and fatigue resistant effects, the extent to which the threads of two fasteners of a connection embodying the invention interfere with one another must be much greater than would be utilized for only a simple self-locking action. More particularly, the force which is exerted axially between the interfering threads in a connection embodying the invention, under no load conditions, is preferably equal to at least about twenty percent, and for best results between about twenty-seven and forty percent of the ultimate tensile load of the externally threaded fastener of the connection, the ultimate tensile load being defined as the load at which the externally threaded fastener will fail under tension. The two helically non-aligned threads of one of the fasteners are turned relative to one another through an angle attaining these axial force conditions.

When a composite nut embodying the invention is formed by securing together two separately formed prethreaded nut bodies, those bodies are desirably welded together in an essentially unstressed condition. One method for achieving this result involves first positioning two separately formed internally threaded nut bodies on a threaded mandrel in a condition in which the nuts just contact but do not exert substantial axial force against one another. The relative rotary positions of the two nuts in this setting are then noted, as by marking the nuts to indicate that setting, following which the nuts are removed from the mandrel and then placed against one another and secured together in axial alignment, with their threads turned slightly relative to one another, beyond the noted position, to have an interfering engagement with a coacting screw. This method thus avoids any necessity for maintaining the nut bodies during welding in a stressed condition of interfering threaded engagement with the screw with which the composite fastener is to ultimately mate, or its equivalent.

Certain particular features of the invention relate to a unique method by which a fatigue resistant threaded connection embodying the invention is formed by screwing together two threaded fasteners, one of which has two aligned but relatively rotated threads as discussed above. In that method, the two threads convert between two different conditions during assembly of the connection in a manner optimizing the distribution of load forces between the different turns of the threads, and minimizing fatigue of the threads. In a first of those conditions, as the parts are being screwed together, the two aligned but relatively rotated threads of one fastener exert force in opposite axial directions against the thread of the other fastener. In the second condition, as the two fasteners are tightened together to preload the connection, the two relatively rotated threads act in a common axial direction against the other fastener.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
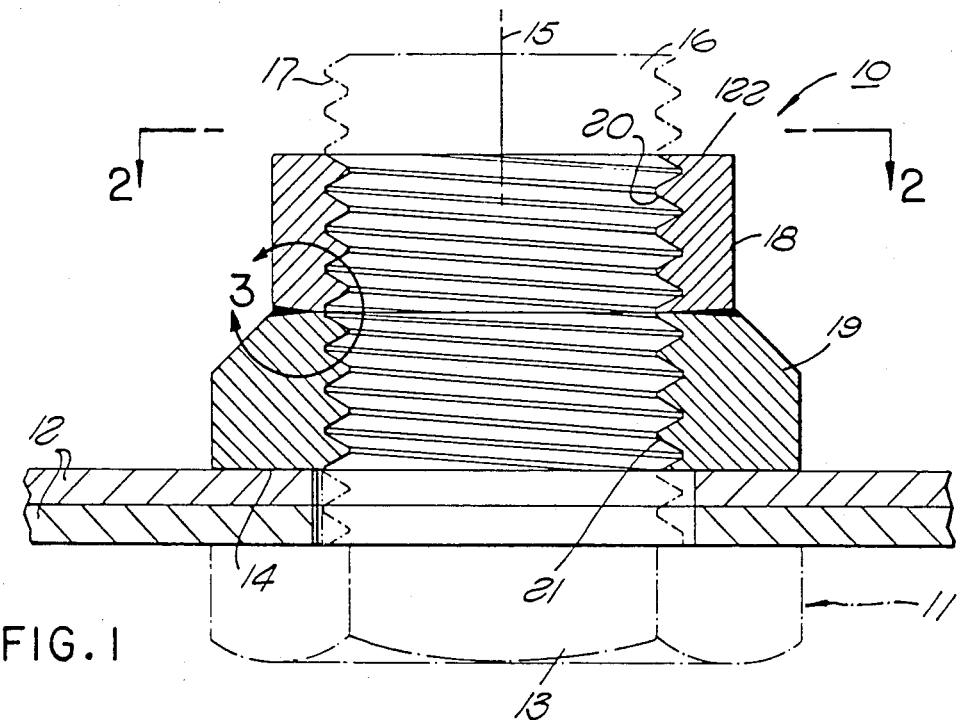
FIG. 1 is an axial section through a threaded connection formed in accordance with the present invention.

FIG. 1 illustrates a fatigue resistant self-locking threaded connection constructed in accordance with the invention and including a nut 10 connected to a coacting screw or bolt 11, with plates 12 clamped between the enlarged diameter head 13 of the screw and an annular load-bearing face 14 formed at the inner or lower end of the nut and disposed transversely of axis 15 of the screw and nut. The shank 16 of the screw has external threads 17 of uniform diameter along the entire axial extent of the shank and typically illustrated as of standard sixty degree configuration as viewed in axial section. It will of course be understood that the particular overall assembly of parts shown in FIG. 1, including the plates 12 clamped between screw 11 and nut 10, is merely illustrative of one of the many environments in which a connection embodying the invention may be employed.

The nut 10 may in some instances be formed as a one piece integral structure having two helically misaligned threads, but preferably includes two initially separately formed nut bodies 18 and 19 having internal threads 20 and 21 respectively which may be identical with one another and are of uniform diameter, and have a thread profile and diameter corresponding to and adapted to engage the external thread 17 on screw 11. Bodies 18 and 19 and the engaged screw 11 are essentially rigid, and in most instances are formed of metal, such as steel, but are adapted to be deformed very slightly when tightened against a work piece such as plates 12, and to resiliently resist such deformation in a manner developing internal stresses within the material of the nut bodies and screw which act to return those elements by the resilience of the material of which they are formed to their initial condition when the load forces are released. The two bodies 18 and 19 are initially formed with transverse end faces 22 and 23 disposed perpendicular to axis 15 and adapted to abut annularly against one another to transmit axial forces between bodies 18 and 19. The bodies are rigidly secured in fixed relative positions, desirably by fusion bonding them together annularly at 24, preferably entirely about axis 15 and at the locations of the two abutting surfaces 22 and 23. In some instances, it is contemplated that other means of attachment of the two bodies rigidly together may be utilized. The preferred method of attachment is by electron beam welding, as represented diagrammatically in FIG. 4, in which 25 represents an electron beam gun disposed perpendicular to the axis 15 of nut 10 and aimed radially inwardly at the location of abutting surfaces 22 and 23, to form the annular weld 24 between bodies 18 and 19 as those bodies are turned about axis 15 relative to the gun 25. This relative rotation may be effected either by maintaining the electron beam gun 25 stationary and rotating the nuts, or vice versa by maintaining the nut bodies stationary and moving the electron beam gun 25 circularly about axis 15. The result is to fuse the material of bodies 18 and 19 together, annularly about axis 15, and radially inwardly from their peripheries at the locations of surfaces 22 and 23 far enough to attain the desired rigid connection between the two nut bodies.

Externally, the upper or outer nut body 18 may be non-circular to be engaged and turned by a wrench, while the lower body 19 may be externally circular and desirably larger in diameter than body 18 for most effective transmission of axial load forces to plates 12. The outer surface of body 19 may flare frustoconically at 119 to an enlarged diameter, and then extend cylindrically at 219. In most instances, body 18 should be externally either hexagonal as illustrated in FIG. 2, or of 12 point wrench-engaging configuration.

Figure 2:
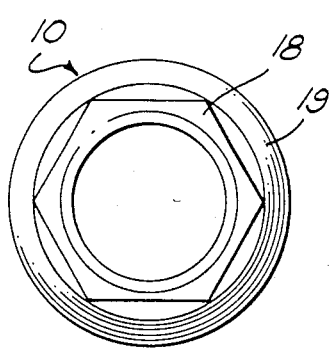
FIG. 2 is a reduced plan view taken on line 2—2 of FIG. 1.
Figure 3:
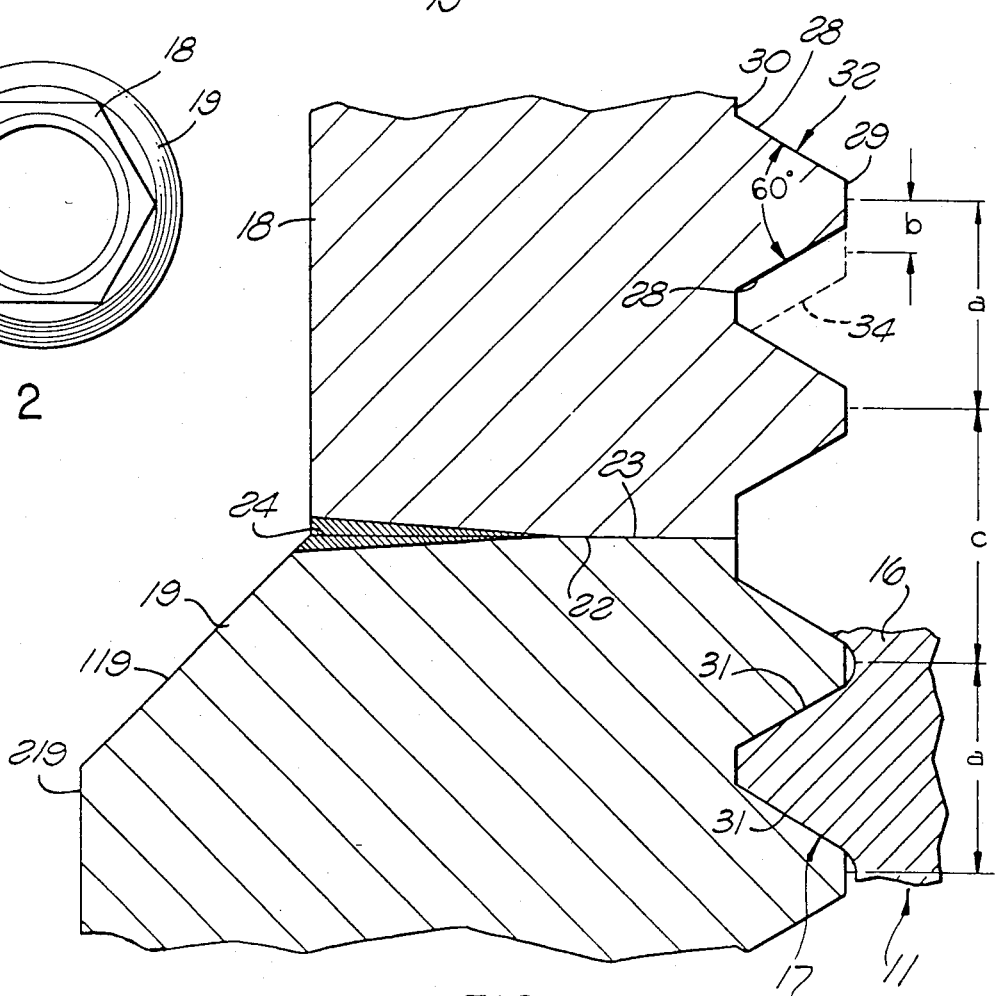
FIG. 3 is a greatly enlarged fragmentary axial section corresponding to a portion of FIG. 1.

In the arrangement of FIGS. 1 to 3, the internal threads 20 and 21 in nut bodies 18 and 19 are identical and are formed integrally with those bodies, as by initially forming bodies 18 and 19 in unthreaded form and then tapping or otherwise machining threads in their interior. It is contemplated broadly that the threads 20 and 21 and the engaging external threads 17 on screw 11 may be of any desired thread profile, but in most instances standard 60° threads are utilized. The drawings, in FIGS. 1 and 3, typically illustrate such standard threads. The two nut bodies 18 and 19 may be of equal axial extent, or of different axial extents. Preferably, each of the internal threads 20 and 21 has several turns between its upper and lower ends (say three or four turns). The standard threads illustrated in FIG. 3, as viewed in axial section, have opposite side faces 28 disposed at a 60° angle to one another and have directly axially extending minor diameter peak portions 29 and directly axially extending major diameter surfaces 30. The pitch of the threads in each of the nuts 18 and 19 is uniform for the entire axial extent of that body. More specifically, considering the upper nut body 18, the pitch distance a between the centers of successive turns of thread 20 in that body is uniform from the location of bottom surface 22 of the nut body to the upper surface 122 of that body. Similarly, the pitch distance axially between the centers of successive turns of lower nut 19, as viewed in axial section, is uniform from the bottom face 14 of nut 19 to its upper end surface 23, and is equal to the pitch distance a of upper body 18. In FIG. 3, one turn of the external thread 17 of screw 11 is illustrated in engagement with and between two of the turns of the lower nut 19, to represent the manner in which the thread faces 31 of each turn of external thread 17 of the screw engage and apply force axially to faces 28 of internal threads 20 and 21 of the two nut bodies.

The two nut bodies 18 and 19 and their internal threads 20 and 21 are aligned with one another axially, both being centered about the common axis 15. In order to introduce a substantial load distributing and fatigue resisting effect into the composite nut 10, the two nut bodies 18 and 19 are secured together by weld 24 in relative positions in which internal threads 20 and 21 have a high torque interfering fit with thread 17 of screw 11. Stated differently, it may be considered that upper body 18 before attachment to lower body 19 is turned relative to lower body 19 about axis 15 through a substantial angle, so that the upper thread 20 is then not a true helical continuation of lower thread 21, and therefore does not engage the thread of screw 11 in exactly the same manner as does thread 21. Referring to FIG. 3, which is an axial section through portions of the two threads 20 and 21, in a plane containing central vertical axis 15 of the composite nut, it is noted that as viewed in axial section, each of the individual turns 32 of thread 20 is in effect shifted upwardly a distance b from the position which it would assume (position represented in broken lines at 34) if body 18 were in a rotary position in which its thread was located to be a true helical continuation of the internal thread of body 19. The result is that, still considering the two connected nut bodies as viewed in axial section (FIG. 3), the effective pitch distance c between the uppermost turn of lower nut body 19 and the lowermost turn of upper nut body 18 is greater than the pitch distance between successive turns of nut 18 and between successive turns of nut 19, the difference between the pitch distances a and c of FIG. 3 being the previously mentioned dimension b through which the thread of nut 18 as viewed in axial section appears to be shifted upwardly relative to the thread of nut 19 as a result of the relative rotation of the two parts before them together. This axial offsetting of the two securing threads, which may be somewhat exaggerated in FIG. 3 for illustrative purposes, causes the upper and lower threads of the nut to exert a very high tensile force in opposite axial directions against the threads of an engaged mating screw, and to thereby stretch the screw axially, while exerting correspondingly high compressive forces against the nut, resulting in attainment of a very effective load distributing and fatigue resisting effect in the overall composite nut and screw assembly.

Figure 4:
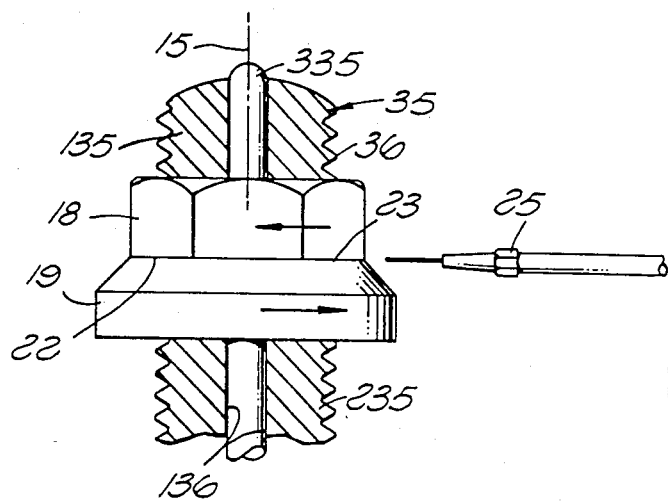
FIG. 4 is a front elevational view representing a step in the manufacture of the nut of FIGS. 1 to 3.

FIG. 4 represents one way in which the two nut bodies 18 and 19 may be set to the desired predetermined positions before welding. As shown in FIG. 4, the nuts 18 and 19 may first be screwed onto a mandrel 35 having external threads 36 corresponding to thread 17 of the screw 16 with which nut 10 is to be utilized. After both of the nuts 18 and 19 have been positioned on the externally threaded mandrel, the two nut bodies 18 and 19 are turned relative to one another about axis 15 in directions acting to force end faces 22 and 23 of the nuts axially against one another developing internal stresses within the nut bodies and within their threads until the desired predetermined interference torque is attained between the composite assembly 10 and mandrel 35. When a proper internal stress has been achieved, the electron beam gun 25 is utilized as previously discussed to form the peripheral annular weld 24 between the bodies as either the gun or nut and mandrel are turned, to permanently secure the nuts in that relative position. The two part nut is then unscrewed from the mandrel, relieving the stresses within the two bodies 18 and 19 and their threads 20 and 21, with the result that by virtue of the resilience of the material of nuts 18 and 19 their threads 20 and 21 assume the positions represented in FIG. 3 and discussed above, in which the thread 20 as viewed in axial section at any point about axis 15 is offset axially away from thread 21.

It is contemplated that the mandrel 35 either may be a rigid one piece threaded part, in which case the nuts are screwed onto and off of the mandrel by relative rotation as discussed above, or alternatively may be a collapsible mandrel constrictable to a reduced diameter condition in which its threads do not contact and can move axially past the threads of the nuts without relative rotation, to thereby facilitate movement of the nut bodies 18 and 19 onto the mandrel, and removal of the welded composite nut therefrom. In FIG. 4, the mandrel 35 is typically illustrated as such a collapsible mandrel, having two halves or sections 135 and 235 with interrupted or partial threads 36, and with these sections being separated by a spacer 335 slidably received between parallel axially extending inner surfaces 136 of sections 135 and 235. When spacer 335 is in the position illustrated in FIG. 4, the partial threads of sections 135 and 235 are complementary so that the mandrel assembly can act as a single rigid threaded stud onto and off of which the nut bodies 18 and 19 may be screwed as previously discussed. When spacer 335 is withdrawn axially from between sections 135 and 235, those sections can move laterally together to bring their surfaces 136 into engagement with one another, and thus reduce the effective diameter of the mandrel to a condition enabling it to be inserted axially into the nut bodies 18 and 19 without relative rotation, following which the mandrel may be expanded by moving spacer 335 axially between sections 135 and 235. The nuts may then be turned against one another to develop a desired interference stress, and then be welded together, after which the mandrel may again be collapsed by removal of spacer 335 for easy withdrawal of the mandrel from the nuts without relative rotation.

After the composite nut 10 has been removed from the mandrel, the nut can be screwed onto a bolt or stud as represented at 11, and will have an extremely effective load distributing and fatigue resisting action with respect thereto. As the lower nut 19 is first advanced onto screw 11, the various turns of thread 21 of course mate exactly with the external thread 17 of the screw, and can be turned onto the screw with little or no frictional resistance. When the lower turn of thread 20 reaches a point of contact with thread 17 of the screw, however, that thread 20 does not move as easily into engagement with the thread of the screw, but rather has an interfering fit therewith requiring deformation of the nut and/or screw threads in order to advance the nut farther onto the screw. Considering again FIG. 3, as the portion of the lower turn of thread 20 in body 18 which is illustrated in that figure reaches a point of contact with the external thread of the screw, that thread of the screw exerts force downwardly against the lower turn of the thread in body 18 to pull that turn downwardly closer to a position of true helical alignment with the thread of lower body 19. At the same time, upward forces are exerted on the thread of lower body 19, thus resiliently deforming the threads of both bodies, and opposing forces are exerted on the thread of the screw to resiliently lengthen the screw axially. As the rest of the turns of upper body 18 advance onto the screw, similar forces are exerted against those turns, with the result that the internal stresses developed in the nut and screw as they are resiliently deformed enable attainment of a highly effective load distributing and fatigue resisting action in the ultimate fully made up preloaded connection of FIG. 1.

When the composite nut 10 of FIG. 1 is tightened downwardly against work pieces 12, the above discussed relative orientation of the threads of nut bodies 18 and 19 causes the axial load forces to be distributed more effectively over the different turns of the nut thread than if a nut of uniform pitch were utilized. Whereas in a conventional nut most of the load forces are taken by the lowermost turns, and failure therefore occurs at that location, the relative rotary orientation of threads 20 and 21 in FIG. 1 has the effect of shifting much of the load which would normally be taken by the lower turns of the nut to the upper thread 20 in nut body 18. This enables both the nut and screw threads to take a greater overall tensile load without damage to either, and also greatly increases their resistance to fatigue load failure under repetitive or fluctuating stress and strain conditions.

Figure 5:
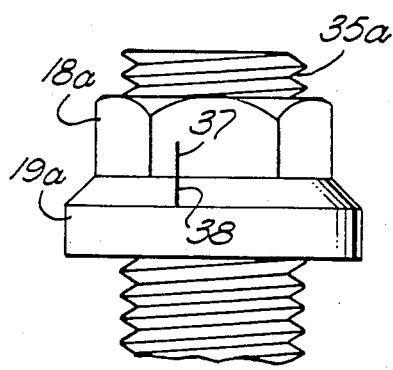
FIG. 5 is a view similar to FIG. 4, but showing a step in a second method of manufacturing the nut.
Figure 6:
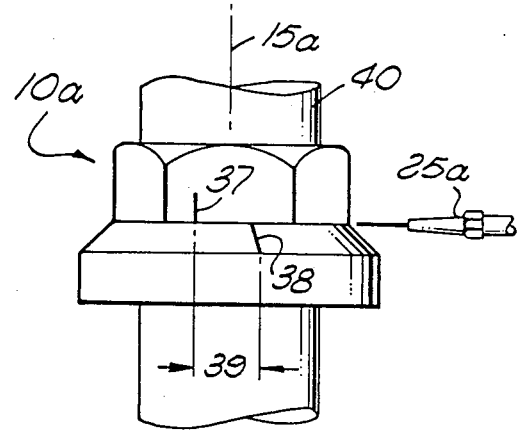
FIG. 6 is an elevational view showing the second step in the manufacture of the nut of FIG. 5.

FIGS. 5 and 6 show a method which is preferred over that of FIG. 4 for determining the relative positions at which two nut bodies 18a and 19a (corresponding to nuts 18 and 19 of FIGS. 1 to 4) may be properly oriented before being welded together. In FIG. 5, it may be assumed that the lower nut 19a has first been screwed onto an externally threaded mandrel 35a (or moved axially onto a collapsed mandrel of the type shown at 35 in FIG. 4), following which the second and preferably hexagonal nut body 18a is similarly screwed or moved axially onto the mandrel. If the mandrel is of the collapsible type, it is expanded into threaded engagement with the nuts, and the nuts are turned to positions in which nut 18a just contacts nut 19a but does not exert substantial axial force thereagainst. In that position, the thread within nut 18a may be considered as located to be a true helical continuation of the internal thread within nut 19a. With the nuts in this relative position, axially aligned marks 37 and 38 may be formed on the two nuts 18a and 19a, at corresponding locations about their periphery. The two nuts 18a and 19a are then removed from mandrel 35a (either by unscrewing them or collapsing and withdrawing the mandrel), and may then be moved axially onto an externally cylindrical unthreaded mandrel 40 to axially abutting positions similar to those in which they were marked in FIG. 5, following which one of the nuts 18a or 19a is turned relative to the other about their common axis 15a to a position such as that represented in FIG. 6 in which there is a predetermined angular distance 39 between the two marks 37 and 38 on the nuts. This rotation of the nuts is in a direction which would have tightened the nuts toward one another if they were still on the mandrel 35a and which would therefore have developed internal stresses as discussed in connection with FIG. 4. No such stresses are in fact developed in the FIGS. 5 and 6 method, however, but instead the two nuts 18a and 19a may just contact one another with no substantial axial force therebetween. The angle represented at 39 in FIG. 6 is just sufficient to develop a predetermined load distributing and fatigue resisting effect in a connection utilizing the composite assembly 10. With the parts 18a and 19a thus positioned as shown in FIG. 6, and held in axial alignment by close fitting engagement of the minor diameter portions of the nut threads on mandrel 40, an electron beam gun 25a is actuated to form a peripheral annular weld corresponding to that shown at 24 in FIGS. 1 and 3, either by turning the two nuts relative to the electron beam gun, or vice versa. After the nuts 18a and 19a have been welded in this condition, their internal threads as viewed in axial section will be offset axially away from one another as seen in FIG. 3, and as a result will have an interfering fit with a coacting screw such as that shown at 11 in FIG. 1, giving the nut the same type of load distributing and fatigue resisting action discussed in connection with FIGS. 1 through 4. The method of FIGS. 5 and 6 avoids the necessity for forceably unscrewing the welded nut in highly stressed condition from a threaded mandrel identical to the screw or bolt with which it is ultimately to be used, and thereby avoids the inconvenience of such forced removal and the possible resultant damage to both nut and mandrel which may be caused by such forced removal.

Figure 7:
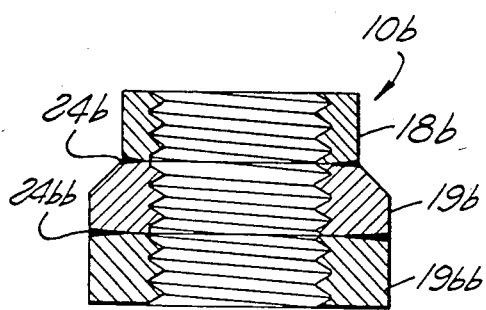
FIG. 7 is a view similar to a portion of FIG. 1, but showing a three section nut.

It is contemplated that more than two of the nut bodies may be welded or otherwise secured together in order to further increase the load distributing and fatigue resisting effects. For example, FIG. 7 shows a composite nut 10b in which three nut bodies 18b, 19b and 19bb are secured together in superimposed axially aligned positions, by peripheral annular welds 24b and 24bb corresponding to weld 24 of FIGS. 1 and 3. The internal threads within bodies 18b, 19b and 19bb may be identical with one another, but with the thread in body 19b being turned through a predetermined angle relative to the thread of body 18b, and with the thread of body 19bb being turned through a further angle relative to the thread in body 19b in directions such that when the composite nut 10b is screwed onto an externally threaded stud of uniform pitch, the interengagement of the threads urges bodies 18b and 19b relatively axially together and against one another, and urges bodies 19b and 19bb relatively axially together and against one another, to attain an interference torque between each pair of bodies and to distribute the load forces between the three nuts. Similarly, more than three nuts may be welded together if desired. Externally, nuts 18b and 19b may have the same configuration as nuts 18 and 19 of FIGS. 1 to 4, and the third nut 19bb may be externally cylindrical and of an enlarged diameter corresponding to nut 19b.

Figure 8:
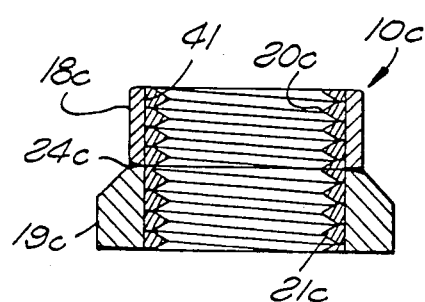
FIG. 8 is a view similar to FIGS. 1 and 7 showing still another form of the invention.

FIG. 8 shows another nut 10c which may be identical with nut 10 of FIGS. 1 to 4 except that the internal threads 20c and 21c are initially formed separately from outer annular nut bodies 18c and 19c within which they are received, and are welded or otherwise bonded to the inner cylindrical surfaces 41 of bodies 18c and 19c, before those bodies 18c and 19c are secured together by peripheral annular welding at 24c corresponding to the weld 24 of FIG. 3. More specifically, the inner thread 20c within body 18c may be formed as an elongated metal wire-like element coiled helically to form the successive turns of the thread, and shaped at its radially inner side to a standard thread profile, with the outer cylindrical surface of the coiled element being secured annularly to the inner cylindrical surface 41 of body 18c by electron beam welding under the teachings of my prior U.S. Pat. Nos. 4,040,462 and 3,938,209. Thread 21c in body 19c may similarly be formed as an elongated wire coiled to thread configuration and welded annularly to the inner surface of the body 19c. After thread 20c has been welded into body 18c, and thread 21c has been welded into body 19c, the two bodies and their contained threads are then turned to relative positions in which they will have the desired load distributing and fatigue resisting action, with the relative orientation typically being determined by the method discussed in connection with FIG. 4 or the method discussed in connection with FIGS. 5 and 6. The weld 24c is then formed to complete the composite nut, which will have the same type of predeterminable load distributing and fatigue resisting effects discussed in connection with the other forms of the invention.

Figure 9:
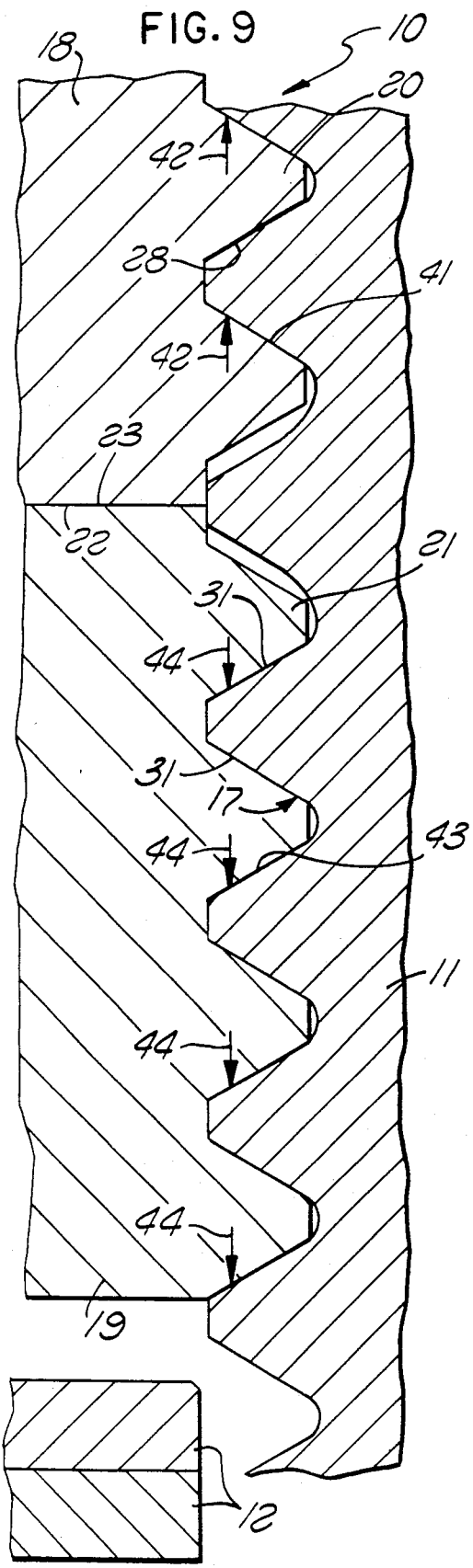
FIG. 9 is an enlarged fragmentary axial section representing a portion of the connection of FIG. 1 as the nut is being advanced onto the screw but before they have reached a fully made-up condition.
Figure 10:
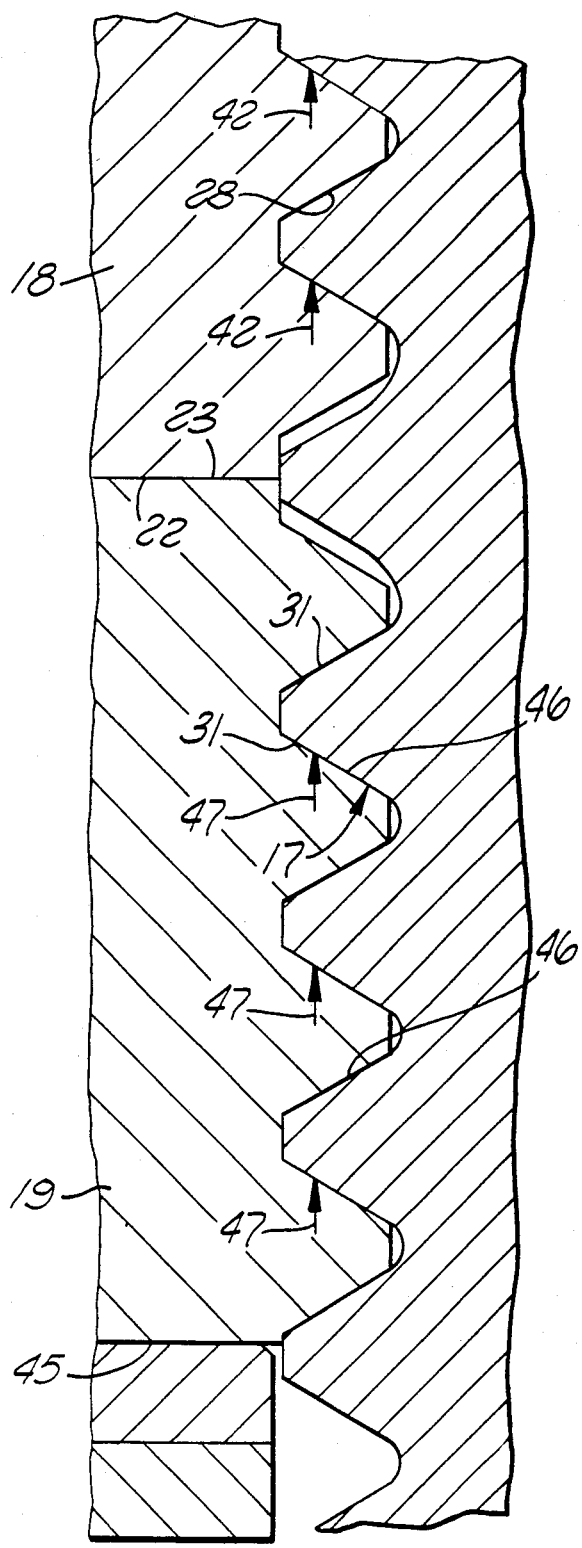
FIG. 10 shows the connection of FIGS. 1 and 9 in fully made-up preloaded condition.

Referring now to FIGS. 9 and 10, these two figures illustrate somewhat diagrammatically and in enlarged form two different conditions of the mating screw and nut threads of the FIG. 1 threaded connection as the elements of that connection are assembled together and then tightened to a fully made-up preloaded state. FIG. 9 represents the relationship between the threads of the screw 11 and composite nut 10 after the nut has been threadedly advanced downwardly onto the screw and to a condition in which the internal threads 20 and 21 of the interconnected nut bodies 18 and 19 are both in engagement with the external thread 17 of screw 11, but before the nut has reached a position of engagement with plates 12. In that FIG. 9 condition, the relatively rotated helically non-aligned internal threads 20 and 21 of the composite nut have an interfering engagement with the external thread 17 of screw 11, as previously discussed, introducing a predetermined resistance to threaded advancement of the nut onto the screw. More particularly, since the internal thread 20 of upper nut body 18 is offset upwardly or axially outwardly from the position which it would assume if it were a true helical continuation of the internal thread 21 of lower nut body 19, the overall result is to cause the upper faces of thread 20 to exert upward axial force against the engaged lower faces of thread 17 of the screw at 41, as represented by the arrows 42 in FIG. 9, while the lower or axially inner faces of thread 21 of the lower nut body 19 exert downward axial force against the engaged upper faces of thread 17 of the screw at 43 as represented by the arrows 44 of FIG. 9, thereby slightly stretching screw 11 axially and slightly compressing the composite nut body axially against the resistance offered by the inherent resilience of these parts, with that resilience tending to return the screw and nut to their initial conditions and thereby maintaining tight frictional engagement of the threads at the locations 41 and 43.

As the nut is advanced farther downwardly or axially inwardly onto screw 11, the discussed stretching force is exerted by the nut on the screw until the nut reaches a position of engagement with plates 12, as represented in FIGS. 1 and 10, at which point the confinement of plates 12 between head 13 of the screw and the lower end shoulder surface 14 of the lower nut body causes the plates to function as a stop shoulder with respect to shoulder surface 14 on the nut, pressing that surface tightly against the upper surface of the top plate 12 with increasing force as the nut is tightened relative to the screw. Upon initial engagement of the nut with the plate, and before any substantial force is applied by the nut to the upper plate 12, the condition of the threads remains as discussed above in connection with FIG. 9. However, as the nut is progressively tightened on the screw and downwardly against the plates, the force applied by the nut against the plates at the stop shoulder location 45 in FIG. 10 causes further axial stretching of screw 11 between the location of engagement of its head 13 with the underside of the bottom plate 12 and the locations of threaded engagement of the screw with the threads of the nut. This stretching of the screw causes the portion of the thread of screw 11 which is in engagement with the internal thread 21 in lower nut body 19 to move downwardly relative to the portion of the screw thread engaging internal thread 20 of upper nut body 18, relieving the previously discussed tight frictional engagement between the threads of screw 11 and nut body 19 at the locations 43 of FIG. 9, and ultimately upon continued tightening of the nut causing the lower or axially inner faces of thread 17 of the screw to apply downward axial force to the upper faces of thread 21 of lower nut body 19 at 46 in FIG. 10, with this force being resisted by an upward force applied by lower nut body 19 to the engaged screw thread faces as represented by the arrows 47 in FIG. 10. The direction of application of force by lower nut body 19 to the screw has thus reversed, and is in the same direction as the force applied by upper nut body 18 to the screw at 42. The tightening of the nut relative to the screw first acts to shift some of the load on the screw downwardly to the upper turn of thread 21, then upon further tightening shifts a portion of the load to the next lower turn of thread 21, then to the next successive lower turn, etc. until all of the turns of thread 21 are taking their share of the load. The tightening is preferably continued until the total upward force exerted against thread 17 of the screw by the turns of thread 21 of nut body 19 is approximately equal to the total upward force exerted against thread 17 by the turns of thread 20 of nut body 18, assuming that threads 20 and 21 have an equal number of turns.

The extent to which the upper nut body 18 is turned relative to the lower nut body 19 before they are welded together may be predetermined to attain the discussed substantial equality between the loads taken by the two nut bodies in the pre-loaded condition for which the nut and screw are designed, so that in the final fully made-up preloaded condition of the overall threaded connection much more of the load is taken by the upper turns 20 of the composite nut body and the turns of the screw thread engaged therewith than is true in a conventional nut having a standard thread following a true helix along the entire length of the nut. This improved distribution of the load forces along the length of the nut enables the connection to take a maximum load without applying that load excessively to the bottom thread of the screw, and therefore permits the connection to resist fatigue and tensile failures in use. If the nut for any reason becomes loosened with respect to the screw after a period of use, the nut automatically reverts to the self-locking condition illustrated in FIG. 9, in which the two nut bodies apply forces in opposite axial directions as represented at 42 and 44 in that figure, thereby preventing complete separation of the nut from the screw.

In order to achieve an effective load distributing and fatigue resisting effect, it is essential that threads 20 and 21 of nut 10 be turned relative to one another far enough to develop extremely high axial forces between the screw and nut in the FIG. 9 condition of the parts, that is, before preloading of the connection and solely as a result of the interfering relationship between the screw and nut threads. The tensile force tending to stretch screw 11 as a result of the upward forces applied to its thread at 42 and the downward forces at 44, and the equal and opposite compressive force applied to the nut, must be many times as great as the axial forces which would be required and used if only a simple self-locking action were desired. The application torque required for initially screwing the nut onto the screw is correspondingly many times as great as the torque associated with self-locking nuts. These very high tensile and compressive forces are best defined by comparing them to the 'Ultimate Tensile Load' of the screw 11, with that term being defined as the load at which the screw will fail in tension. More particularly, it is preferred that the tensile force applied to screw 11 and the opposed compressive force applied to the nut solely as a result of the interfering relationship of the threads and before any preloading should be equal to at least about twenty percent, optimally between about twenty-seven percent and forty percent, of the Ultimate Tensile Load of the screw. The nut per se may be defined as having its threads turned relative to one another far enough to achieve these force values when used with a screw having a thread dimensioned to mate with the nut threads and assuming the screw to be made of a material having approximately the same strength as that of the nut.

As an example of the magnitude of the tensile and compressive forces which may be developed in a particular screw and nut combination, assume that the screw and nut have standard ¾- 16 threads (¾inch pitch diameter with 16 turns per inch). Assume also that the screw and nut are formed of alloy steel and are to meet military aircraft specifications, with the screw having an ultimate tensile load of 70,800 pounds at which it will fail in tension. The preload to which such fasteners are tightened in use is preferably sixty-three percent of the Ultimate Tensile Load, or 44,600 pounds. In a screw and nut combination of this size embodying the present invention and in which the screw has an Ultimate Tensile Load of 70,800 pounds, the tensile force applied to the screw and the compressive force applied to the nut solely as a result of the interfering engagement of the threads in the FIG. 9 condition of the parts is at least about 14,160 pounds (twenty percent of 70,800 pounds) and optimally between about 19,116 and 26,320 pounds (twenty-seven percent and forty percent respectively of 70,800 pounds).

While certain specific embodiments of the present invention have been disclosed as typical, the invention is of course not limited to these particular forms, but rather is applicable broadly to all such variations as fall within the scope of the appended claims.

I claim:

1. A fatigue resistant threaded connection including a screw, a nut and a work piece or work pieces, and which is formed by the method that comprises: connecting together a screw having an external thread and a nut having first and second portions near outer and inner ends respectively of the nut attached rigidly together at a location intermediate said ends and carrying two aligned internal threads respectively of a common pitch engaging said external thread at different locations; with said two internal threads, before engagement with the screw, being retained in fixed relative positions in which one internal thread is not a true helical continuation of the other, and in which portions of the two internal threads lying in a common axial plane are spread slightly farther apart axially than if the internal threads were true helical continuations of one another;

initially applying force to said external thread of the screw by each of said two internal threads of the nut in a direction axially away from the other internal thread of the nut by virtue of said slightly spread condition of the internal threads;

then tightening said screw and nut threadedly relative to one another against the resistance of a work piece or work pieces to a preloaded condition stretching said screw axially relative to said nut; and in said preloaded condition applying force to said external thread of the screw by said two internal threads of the nut in a common axially outer direction rather than opposite directions axially away from one another;

the radial thickness of said nut, between the major diameter of said internal threads and a radially outer surface of the nut, being substantially as great at said intermediate location as at said first portion of the nut to transmit high preload forces from said first portion through said intermediate location to said second portion of the nut, for transmission by said second portion to said work piece or work pieces, without excessive deformation of the nut at said intermediate location.

2. A fatigue resistant threaded connection as recited in claim 1, in which said two internal threads of said nut in said preloaded condition apply approximately equal force in said axially outer direction to said thread of the screw.

3. A fatigue resistant threaded connection as recited in claim 1, in which said force applied in opposite axial directions to said thread of the screw by said threads of the nut prior to tightening of the screw and nut against the resistance of said work piece or work pieces is equal to at least about twenty percent of the ultimate tensile load of said screw at which the screw will fail in tension.

4. A fatigue resistant threaded connection as recited in claim 1, in which said force applied in opposite axial directions to said thread of the screw by said threads of the nut prior to tightening of the screw and nut against the resistance of said work piece or work pieces is equal to between about twenty-seven and forty percent of the ultimate tensile load of said screw at which the screw will fail in tension.

5. A fatigue resistant threaded connection as recited in claim 1, in which said screw and nut in said preloaded condition are tightened against said work piece or work pieces enough to assure that all turns of said internal threads apply force to said external thread in said common axially outer direction.

* * * * *